(12) United States Patent
Joyce et al.

(10) Patent No.: US 10,571,908 B2
(45) Date of Patent: Feb. 25, 2020

(54) AUTONOMOUS VEHICLE FAILURE MODE MANAGEMENT

(71) Applicants: John P. Joyce, West Bloomfield, MI (US); Scott J. Lauffer, Northville, MI (US); Samer Abbas, Dearborn, MI (US)

(72) Inventors: John P. Joyce, West Bloomfield, MI (US); Scott J. Lauffer, Northville, MI (US); Samer Abbas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/236,780

(22) Filed: Aug. 15, 2016

(65) Prior Publication Data

US 2018/0046182 A1    Feb. 15, 2018

(51) Int. Cl.
| | |
|---|---|
| *G05D 1/00* | (2006.01) |
| *B60W 50/02* | (2012.01) |
| *G01C 21/34* | (2006.01) |
| *G07C 5/00* | (2006.01) |
| *G07C 5/02* | (2006.01) |
| *G07C 5/08* | (2006.01) |
| *H04L 29/08* | (2006.01) |

(52) U.S. Cl.
CPC ....... *G05D 1/0055* (2013.01); *B60W 50/0225* (2013.01); *G01C 21/3415* (2013.01); *G01C 21/3453* (2013.01); *G05D 1/0088* (2013.01); *G07C 5/008* (2013.01); *G07C 5/02* (2013.01); *G07C 5/0808* (2013.01); *H04L 67/12* (2013.01)

(58) Field of Classification Search
CPC .............. G05D 1/0055; G05D 1/0088; G01C 21/3515; G01C 21/3453; G07C 5/008; G07C 5/02; G07C 5/0808; H04L 67/12
USPC .......................................................... 701/26
See application file for complete search history.

(56) References Cited

U.S. PATENT DOCUMENTS

| | | | | |
|---|---|---|---|---|
| 5,410,304 A | * | 4/1995 | Hahn ..................... | B60Q 9/008 340/435 |
| 6,330,499 B1 | | 12/2001 | Chou et al. | |
| 6,351,709 B2 | * | 2/2002 | King ................. | G01C 21/3492 340/990 |

(Continued)

FOREIGN PATENT DOCUMENTS

| | | |
|---|---|---|
| CN | 101446830 A | 6/2009 |
| CN | 102752360 A | 10/2012 |

(Continued)

OTHER PUBLICATIONS

UKIPO Search Report for Application No. GB1712796.0 dated Dec. 6, 2017 (4 pages).

(Continued)

*Primary Examiner* — Angelina Shudy
(74) *Attorney, Agent, or Firm* — Frank A. MacKenzie; Bejin Bieneman PLC (57) ABSTRACT

A first computer including a processor is programmed to receive an indication of a failure mode in a vehicle and wirelessly transmit the indication of the failure mode to a remote server. The computer is further programmed to receive a revised route to a destination based at least in part on the failure mode and operate the vehicle along the revised route.

14 Claims, 3 Drawing Sheets

(56) References Cited

U.S. PATENT DOCUMENTS

| | | | |
|---|---|---|---|
| 6,438,491 B1* | 8/2002 | Farmer | B60W 30/16 340/435 |
| 7,486,802 B2* | 2/2009 | Hougen | G06K 9/00651 348/113 |
| 7,502,718 B2 | 3/2009 | Kanamaru | |
| 7,908,060 B2 | 3/2011 | Basson et al. | |
| 8,019,501 B2* | 9/2011 | Breed | B60J 10/00 701/31.9 |
| 8,099,308 B2 | 1/2012 | Uyeki | |
| 8,190,355 B2 | 5/2012 | Emam et al. | |
| 8,392,111 B2* | 3/2013 | Ryu | G01C 21/3492 701/117 |
| 8,751,154 B2* | 6/2014 | Zhang | B60W 30/09 701/411 |
| 8,825,270 B2 | 9/2014 | Chen | |
| 8,849,496 B2* | 9/2014 | Miyamoto | G01C 21/362 701/29.2 |
| 8,874,267 B1 | 10/2014 | Dolgov et al. | |
| 8,874,305 B2* | 10/2014 | Dolgov | G06T 7/223 701/31.9 |
| 8,874,360 B2* | 10/2014 | Klinger | G08G 1/162 701/22 |
| 8,924,067 B2 | 12/2014 | Halder | |
| 8,924,071 B2 | 12/2014 | Stanek et al. | |
| 8,996,235 B2 | 3/2015 | Singh et al. | |
| 9,157,752 B1 | 10/2015 | Fernandez Garcia et al. | |
| 9,224,053 B1* | 12/2015 | Ferguson | G06K 9/00798 |
| 9,346,400 B2 | 5/2016 | Attard et al. | |
| 9,368,026 B1 | 6/2016 | Herbach et al. | |
| 9,442,487 B1* | 9/2016 | Ferguson | G08G 1/0104 |
| 9,481,367 B1 | 11/2016 | Gordon et al. | |
| 9,487,212 B1 | 11/2016 | Adam et al. | |
| 9,523,984 B1* | 12/2016 | Herbach | B62D 15/025 |
| 9,529,361 B2 | 12/2016 | You et al. | |
| 9,805,423 B1* | 10/2017 | Konrardy | H04W 4/90 |
| 9,841,767 B1* | 12/2017 | Hayward | G08G 1/166 |
| 9,903,728 B2* | 2/2018 | Powers | G01C 21/3415 |
| 9,940,761 B2 | 4/2018 | Kundu et al. | |
| 10,049,505 B1 | 8/2018 | Harvey et al. | |
| 10,054,947 B2* | 8/2018 | Mays | B60T 7/18 |
| 10,083,547 B1* | 9/2018 | Tomatsu | B60K 35/00 |
| 10,086,782 B1* | 10/2018 | Konrardy | G05D 1/0088 |
| 2002/0193923 A1 | 12/2002 | Toyama et al. | |
| 2004/0193334 A1 | 9/2004 | Carlsson et al. | |
| 2004/0217852 A1 | 11/2004 | Kolls | |
| 2008/0084283 A1* | 4/2008 | Kalik | B60Q 9/00 340/435 |
| 2008/0161987 A1 | 7/2008 | Breed | |
| 2010/0205132 A1* | 8/2010 | Taguchi | G08G 1/166 706/46 |
| 2010/0228419 A1* | 9/2010 | Lee | B60W 30/0953 701/25 |
| 2010/0332121 A1* | 12/2010 | Okude | G01C 21/3415 701/533 |
| 2011/0050461 A1* | 3/2011 | Pixley | G08G 1/0104 340/933 |
| 2012/0083959 A1 | 4/2012 | Dolgov et al. | |
| 2012/0123951 A1 | 5/2012 | Hyatt et al. | |
| 2013/0238170 A1* | 9/2013 | Klinger | G05D 1/104 701/3 |
| 2014/0136045 A1 | 5/2014 | Zhu et al. | |
| 2014/0309806 A1* | 10/2014 | Ricci | B60Q 1/00 701/1 |
| 2014/0358353 A1 | 12/2014 | Ibanez-Guzman et al. | |
| 2015/0149021 A1 | 5/2015 | Duncan et al. | |
| 2015/0178998 A1* | 6/2015 | Attard | G07C 5/008 701/23 |
| 2015/0203112 A1* | 7/2015 | Duncan | B60W 30/095 701/1 |
| 2015/0203113 A1* | 7/2015 | Duncan | B60W 30/0953 701/1 |
| 2015/0235480 A1 | 8/2015 | Cudak et al. | |
| 2015/0241225 A1* | 8/2015 | Liu | G01C 21/3682 701/540 |
| 2015/0348335 A1 | 12/2015 | Ramanujam | |
| 2016/0009295 A1* | 1/2016 | Chun | A61B 5/6893 701/32.9 |
| 2016/0147226 A1 | 5/2016 | Akselrod et al. | |
| 2017/0032585 A1 | 2/2017 | Stenneth | |
| 2017/0039785 A1* | 2/2017 | Richter | G07C 5/008 |
| 2017/0072967 A1 | 3/2017 | Fendt et al. | |
| 2017/0090480 A1* | 3/2017 | Ho | G05D 1/0214 |
| 2017/0169628 A1 | 6/2017 | Schroeder et al. | |
| 2017/0274901 A1* | 9/2017 | Herbach | B60W 50/0225 |
| 2017/0341575 A1* | 11/2017 | Hauler | B60Q 1/30 |
| 2017/0357859 A1 | 12/2017 | Jain et al. | |
| 2017/0372431 A1* | 12/2017 | Perl | G06Q 20/10 |
| 2018/0003515 A1* | 1/2018 | Saru | G01C 21/3415 |
| 2018/0037112 A1* | 2/2018 | Otake | B60K 28/06 |
| 2018/0046182 A1* | 2/2018 | Joyce | B60W 50/0225 |
| 2018/0052463 A1* | 2/2018 | Mays | B60T 7/18 |
| 2018/0059687 A1* | 3/2018 | Hayes | G05D 1/0291 |
| 2018/0080777 A1* | 3/2018 | Nimchuk | G01C 21/3415 |
| 2018/0081374 A1* | 3/2018 | Nimchuk | G05D 1/0088 |
| 2018/0082383 A1* | 3/2018 | Bogovich | G01C 21/26 |
| 2018/0268695 A1* | 9/2018 | Agnew | B60W 50/0098 |
| 2018/0365902 A1* | 12/2018 | Tomatsu | G02B 27/0172 |
| 2019/0001941 A1 | 1/2019 | Westlund et al. | |
| 2019/0056735 A1 | 2/2019 | Koopman et al. | |
| 2019/0079513 A1 | 3/2019 | Greenfield et al. | |

FOREIGN PATENT DOCUMENTS

| | | |
|---|---|---|
| CN | 105867351 A | 8/2016 |
| CN | 104169976 B | 5/2017 |
| CN | 103632211 B | 6/2017 |
| JP | 2009187424 A | 8/2009 |
| JP | 5022272 B2 | 9/2012 |
| JP | 2017081382 A | 5/2017 |
| WO | 2014148976 A1 | 9/2014 |

OTHER PUBLICATIONS

Search Report from United Kingdom Intellectual Property Office dated Dec. 6, 2017 regarding Application No. GB1712796.0 (4 pages).

"Smarter Car—A System and Method for Detecting and Alerting to Vehicle Blind Spots", Aug. 26, 2015, retrieved from the Internet URL: https://priorart.ip.com/IPCOM/000242877 (2 pages).

Non-Final Office Action dated Aug. 8, 2019 for U.S. Appl. No. 15/792,029 (35 pages).

Non-Final Office Action for U.S. Appl. No. 15/898,412 as issued by the U.S. Patent and Trademark Office dated Dec. 13, 2019.

* cited by examiner

AUTONOMOUS VEHICLE FAILURE MODE MANAGEMENT

BACKGROUND

Failure modes for autonomous vehicles are associated with different levels of risk that the failure mode will result in an undesirable outcome such as a collision or vehicle breakdown. Some failure modes require that the vehicle immediately pull off of the road in order to minimize the risk. In other cases, a failure mode does not impose an immediate risk, and the vehicle can continue. Analyzing the level of risk associated with a failure mode, identifying alternatives for managing the failure mode, and evaluating risk associated with each of the alternatives, require a substantial amount of computing power and data. Additionally, some data, such as weather data, traffic data, and availability of resources, is changing on a continuous basis. It may not be practical to supply the computing power, or to supply the data in a timely manner, to each vehicle that needs to manage a failure mode.

DESCRIPTION

Introduction

Figure 1:
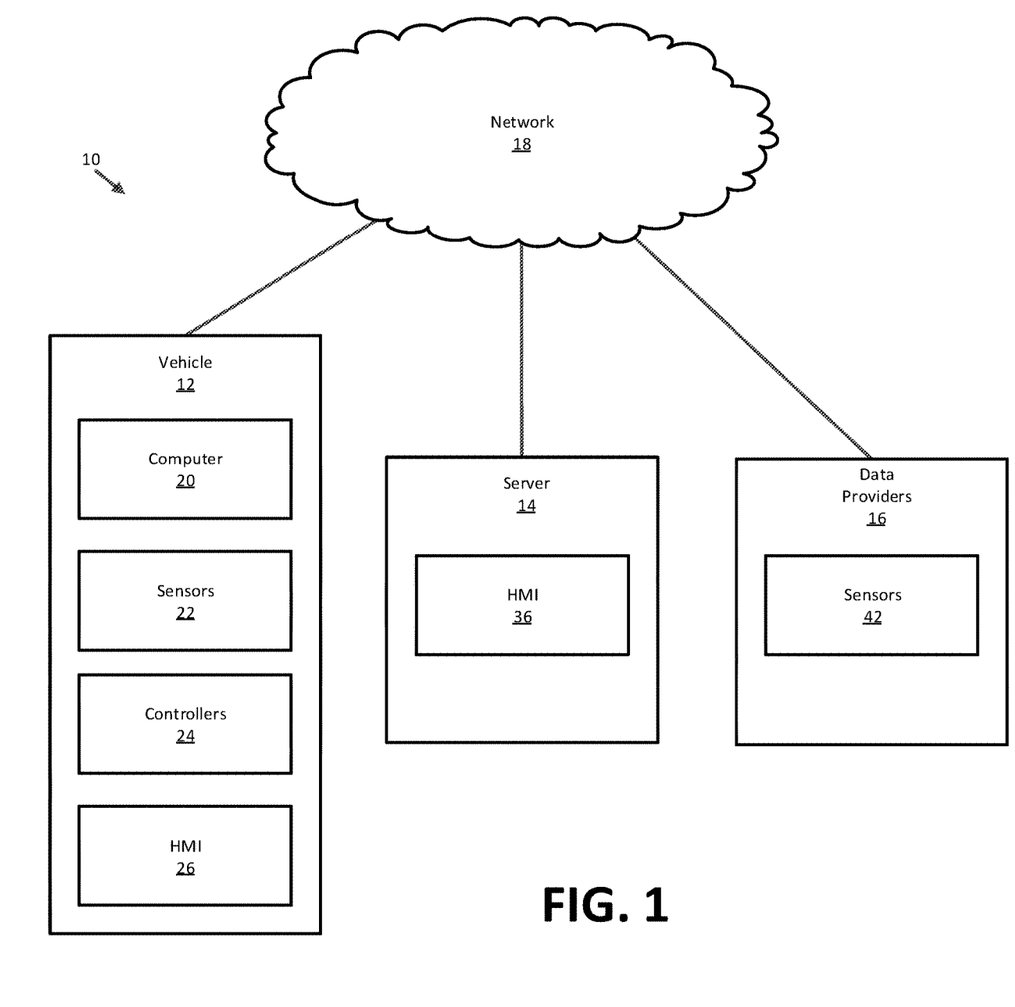
FIG. 1 is a diagram of an exemplary system for managing autonomous vehicle failure modes.

A system 10 for managing failure modes in an autonomous vehicle 12 with a remote server 14 is shown in FIG. 1. The system 10 includes the vehicle 12, the server 14, and one or more data sources 16. The network 18 provides communications between the vehicle 12, the server 14 and the data sources 16.

The vehicle 12 may be an autonomous or semi-autonomous vehicle 12, and includes a computer 20. The computer 20 is generally programmed to control the vehicle 12, and also to provide communication ascribed herein to the vehicle 12 via the network 18. The computer 20 determines a route for the vehicle 12 based on destination information, and generates instructions to drive the vehicle 12 along the route using autonomous vehicle control techniques such as are known.

The vehicle 12 computer 20 is programmed to, prior, during, and/or after operation, monitor one or more operating sub-systems of the vehicle 12 and determine the occurrence of one or more failure modes. The monitoring may include vehicle on-board diagnostics (OBD) such as are known.

In the case that the vehicle 12 determines that a failure mode has occurred, the vehicle 12 computer 20 may wirelessly transmit, to the remote server 14, the failure mode and data related to the operation of the vehicle 12. The failure mode data may include a diagnostic trouble code (DTC) for the vehicle 12, as is known. The DTC may provide specific information as to which operating sub-system in the vehicle 12 exhibited the failure mode, and under what conditions. The vehicle 12 computer 20 may further determine a risk associated with the failure mode and transmit the determined risk of the failure code to the remote server 14. The risk associated with a failure mode, as used herein means a likelihood that the failure mode may result in a collision or vehicle breakdown.

The server 14 receives the failure mode and operational data from vehicle 12 computer 20. In addition, the server 14 may collect data related to operating conditions of the vehicle 12. In some cases the server 14 may collect the additional data from sources other than the vehicle 12 computer 20, for example, from a memory associated with the server 14, or data sources 16.

The server 14 includes an HMI 36, similar to the HMI 26 described with respect to the vehicle 12. The server 14 HMI 36 is programmed to provide data to and receive data from a user. The user may be an operator of the server 14.

Data sources 16 may be, for example, services such as data collection and analysis services, weather reporting services, traffic reporting services, map services, a data service associated with the manufacturer of the vehicle 12, etc. The additional data may include, for example, data related to the particular failure mode for the particular type of vehicle 12. The additional information may further be traffic conditions, weather conditions, etc. along the planned route. The additional data may further include alternative routes to the destination, and traffic and weather conditions along the alternative routes.

For example, the data may include a respective frequencies of one or more failure modes for a type (e.g., make model, year) of vehicle 12. For example, a frequency of a failure mode for a particular failure mode for a particular type of vehicle may be 1 failure in each 300,000 miles traveled.

Further, the data may include weighting factors that indicate dependencies of failure modes on environmental conditions, such as precipitation, ambient temperature, traffic density, age of components in a back-up system, etc. For example, a likelihood that a particular component may fail may increase when the ambient temperature is high and may further increase when traffic volumes are high, causing the vehicle to sit still in high heat for extended periods of time.

Based on the data received from the vehicle 12, and the additional data, the server 14 may determine a risk associated with continuing to the destination. Based, for example, on the risk being within a range of risk, the server 14 wirelessly transmits an instruction to the vehicle 12 to continue to the destination. The range may be a defined as a risk below a threshold. Further, the server 14 may determine that following an alternative route may reduce the risk, and instruct the vehicle 12 to continue to the destination along the alternative route.

In some cases, prior to transmitting the failure mode and operational data to the remote server 14, the vehicle 12 computer 20 may evaluate the failure mode, and make an initial determination of the risk associated with the failure mode. In a case that the risk associated with the failure mode is below a first threshold, the computer 20 may transmit the failure mode along with the risk associated with the failure mode data to the server 14. The computer 20 may further request authorization from the server 14 to continue to the destination.

In the case that the risk associated with the failure mode is, e.g., greater than or equal to the threshold, the vehicle 12 computer 20 may halt the vehicle 12. The computer 20 may further transmit the failure mode and the risk associated with the of the failure mode to the server 14, and may request instructions for further remedial actions.

The threshold for evaluating the risk associated with the failure mode may be determined by the server 14 based on a large number of factors. Some failure modes, such as a brake not working, a steering controller not working, etc. may be determined to exceed the risk level threshold independent of other factors.

In some cases, the threshold may depend on multiple factors. For example, when it is determined that a sensor in the vehicle 12 is not working, the computer 20 may determine whether data from other sensors may be used to compensate for the not-working sensor. In the case that sensor data from other sensors is available, the computer 20 may determine whether, e.g., that certain weather factors may render the data from the other sensors less reliable or less accurate. In such a case, the computer 20 may, e.g., further evaluate current weather conditions to determine a risk level associated with the failure mode.

In the case that the risk associated with the failure mode is above the threshold, the vehicle 12 computer 20 may wirelessly transmit the failure mode data to the server 14. The server 14 may determine remedial measures, and for example, request that a service vehicle proceed to the location of the vehicle 12.

The server 14 may be programmed, prior to transmitting an instruction to the vehicle 12, dispatching a service vehicle to the location of the vehicle 12, or taking other actions, to request authorization from a user. For example, the server 14 may request, via the server 14 HMI 36, authorization from a user of the server 14. As another example, the server 14 may request, via the vehicle 12 HMI 26, authorization from a user of the vehicle 12. As yet another example, the server 14 may send a request to a remote device, such as a mobile device, to receive authorization.

Upon receiving authorization from a user, the server 14 may proceed to transmit the instruction to the vehicle 12 computer 20, request the service vehicle to proceed to the location of the vehicle 12, etc.

System Elements

The vehicle 12 is generally a land-based vehicle 12 having three or more wheels, e.g., a passenger car, light truck, etc. The vehicle includes a computer 20, one or more sensors 22, one or more controllers 24 and a human-machine interface (HMI) 26. The one or more sensors 22, one or more controllers 24, and the HMI 26 are communicatively coupled to the computer 20 as described below.

The computer 20 includes a processor and a memory. The memory includes one or more types of computer-readable media, and storing instructions executable by the processor for performing various operations, including as disclosed herein. Further, the computer 20 may include and/or be communicatively coupled to one or more other computers, including vehicle components such as the sensors 22, the controllers 24, and the HMI 26 which likewise as is known may include respective processors and memories. Communications may be performed via a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

The sensors 22 may be programmed to collect data related to the vehicle 12 and the environment in which the first vehicle 12 is operating. By way of example, and not limitation, sensors 22 may include altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 22 may be used to sense the environment in which the vehicle 12 is operating such as weather conditions, the grade of a road, the location of a road, neighboring vehicles, etc. The sensors 22 may further be used to collect dynamic vehicle 12 data related to operations of the vehicle 12 such velocity, yaw rate, steering angle, engine speed, brake pressure, oil pressure, the power level applied to controllers 24 in the vehicle 12, connectivity between components, etc. The sensors 22 may provide the data to the vehicle 12 computer 20, which may use the data to determine whether the vehicle 12 sub-systems are operating within predetermined ranges or whether one or more of the vehicle 12 sub-systems is exhibiting a failure mode.

In some cases, the sensors 22 may be used by the computer 20 to perform diagnostic tests such as on-board diagnostics (OBD). The computer 20 may, for example, send instructions to a controller 24 to perform a particular operation. The computer 20 may then query sensors 22 associated with the controller 24 to determine whether the controller 24 executed the instruction, and whether the expected result occurred. In the case that a failure mode is detected, the computer 20 may generate a diagnostic trouble code (DTC) that provides information about the failure mode such as which vehicle 12 sub-system failed and under what conditions.

For example, the computer 20 may instruct a brake controller 24 to increase a brake pressure in a brake line by a known amount. A pressure sensor 22 in the brake line may measure the pressure in the brake line and report the pressure to the computer 20. The computer 20 may then determine, based on the measured pressure, whether, e.g., the pressure in the brake line increased based on the instruction to the controller 24.

The one or more controllers 24 for the vehicle 12 may include known electronic control units (ECUs) or the like including, as non-limiting examples, an engine controller, a valve controller, a seat controller, a power steering controller, a door lock controller, a door latch controller, a climate controller, a mirror adjustment controller, a seatbelt controller, a brake controller, etc. Each of the controllers 24 may include respective processors and memories and one or more actuators. The controllers 24 may be programmed and connected to a vehicle 12 communications bus, such as a controller area network (CAN) bus or local interconnect network (LIN) bus, to receive instructions from the computer 20 and control actuators based on the instructions.

Additionally, the controllers 24 may be programmed to perform diagnostic tests (e.g., onboard diagnostics) as necessary to collect data regarding the operation of vehicle 12. The vehicle 12 computer 20 may use the data to determine, for example, whether a failure mode is present within the vehicle 12.

The vehicle 12 human machine interface (HMI) 26 is communicatively coupled to the computer 20 in a known manner such as described above and includes one or more output devices such as a display, lamps, speakers, etc., for communicating data to a user. The HMI 26 further includes one or more input devices such as a touch screen display, buttons, a mouse, a keyboard, a microphone, a gesture recognition device, switches, etc., for receiving input from the user.

The vehicle 12 HMI 26 may be used, e.g., to receive inputs from the user to select a destination for the vehicle 12 or provide information regarding a trip such as planned travel time, number and identity of passengers, etc.

The server 14 is a computer including a processor and a memory, the memory storing instructions which may be executed by the processor. The server 14 can communicate, via the network 18 to the vehicle 12 computer 20, and may further communicate with the one or more data sources 16.

The server 14 is programmed to receive failure mode data and operating condition data from the vehicle 12 computer 20. The server 14 may additionally collect data relating to the vehicle 12 and/or a trip for the vehicle 12 from other sources such as the data sources 16.

For example, the server 14 may collect data related to the failure mode for the vehicle 12. As an example, the failure mode may be a failure of a wheel speed sensor. The server 14 may determine that alternate methods for determining wheel speed are available in the vehicle 12, and that the risk of the alternate methods failing are below a threshold, and accordingly, acceptable. Based on this determination, the server 14 may be programmed to authorize the vehicle 12 to continue to the destination.

As another example, the server 14 may be programmed to receive destination data related to the vehicle 12. Based on the vehicle 12 destination, the server 14 may collect map data for the area through which the vehicle 12 will be travelling. The server 14 may be programmed, based on the data, to identify one or more alternative routes for the vehicle 12.

The server 14 may further be programmed to collect weather data along the original route and the one or more alternative routes.

Following the example above, the server 14 may determine, e.g., that wet conditions may degrade the data from alternate sources of wheel speed data. The server 14 may further determine that rain is expected along the original route during a vehicle 12 trip, and no rain is expected along an alternative route. Based on the failure mode, and the expected weather conditions, the server 14 may authorize the vehicle 12 to continue to the destination, and, instruct the vehicle 12 to proceed along the alternate route where no rain is expected.

The one or more data sources 16 are computers similar to the server 14. The data sources 16 are communicatively coupled with the server 14 and may further be communicatively coupled with the vehicle 12 computer 20. Each of data sources 16 is programmed to provide data such as map data, weather data, traffic data, failure mode data, etc., to the server 14. In some cases, the data source 16 may additionally provide data to the vehicle 12 computer 20.

The data sources 16 may include and/or be associated with sensors 42. As a non-limiting list of examples, the sensors 42 may include thermometers, barometers, wind speed sensors, rain gauges, radiation detectors, cameras, radar, LiDAR, ultrasonic sensors, infrared sensors, light sensors, radio frequency measurement devices, microphones, etc. The sensors 42 may collect data related to the environment of the vehicle 12, and provide the data to the data sources 16. The data sources 16 may provide the collected data, or data generated from the collected data to the server 14 and/or the vehicle 12.

For example, a data source 16 may include sensors 42 and collect weather data such as current air temperature, humidity, etc. The data source 16 may further, based on the collected data, predict future weather conditions, for example along a planned route. The data source 16 may provide both the current weather conditions and predicted weather conditions to the server 14.

The network 18 represents one or more mechanisms by which the one or more vehicles 12, the server 14, and the data sources 16 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

The types of wireless communications may include one or more of cellular, Bluetooth, IEEE 802.11 (typically, Wi-Fi), dedicated short range communications (DSRC), two-way satellite (e.g., emergency services), one way satellite (e.g., receiving digital audio radio broadcasts), AM/FM radio, etc.

Exemplary Process Flows

Figure 2A:
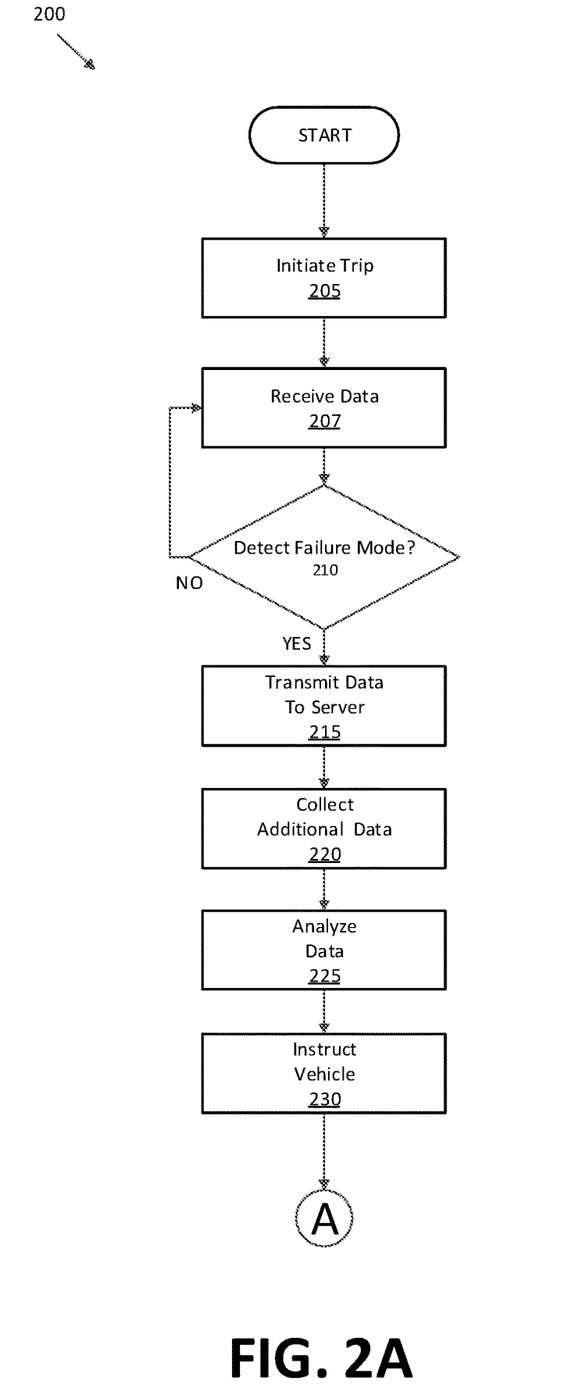
FIGS. 2A and 2B are a diagram of an exemplary process for managing autonomous vehicle failure modes.
Figure 2B:
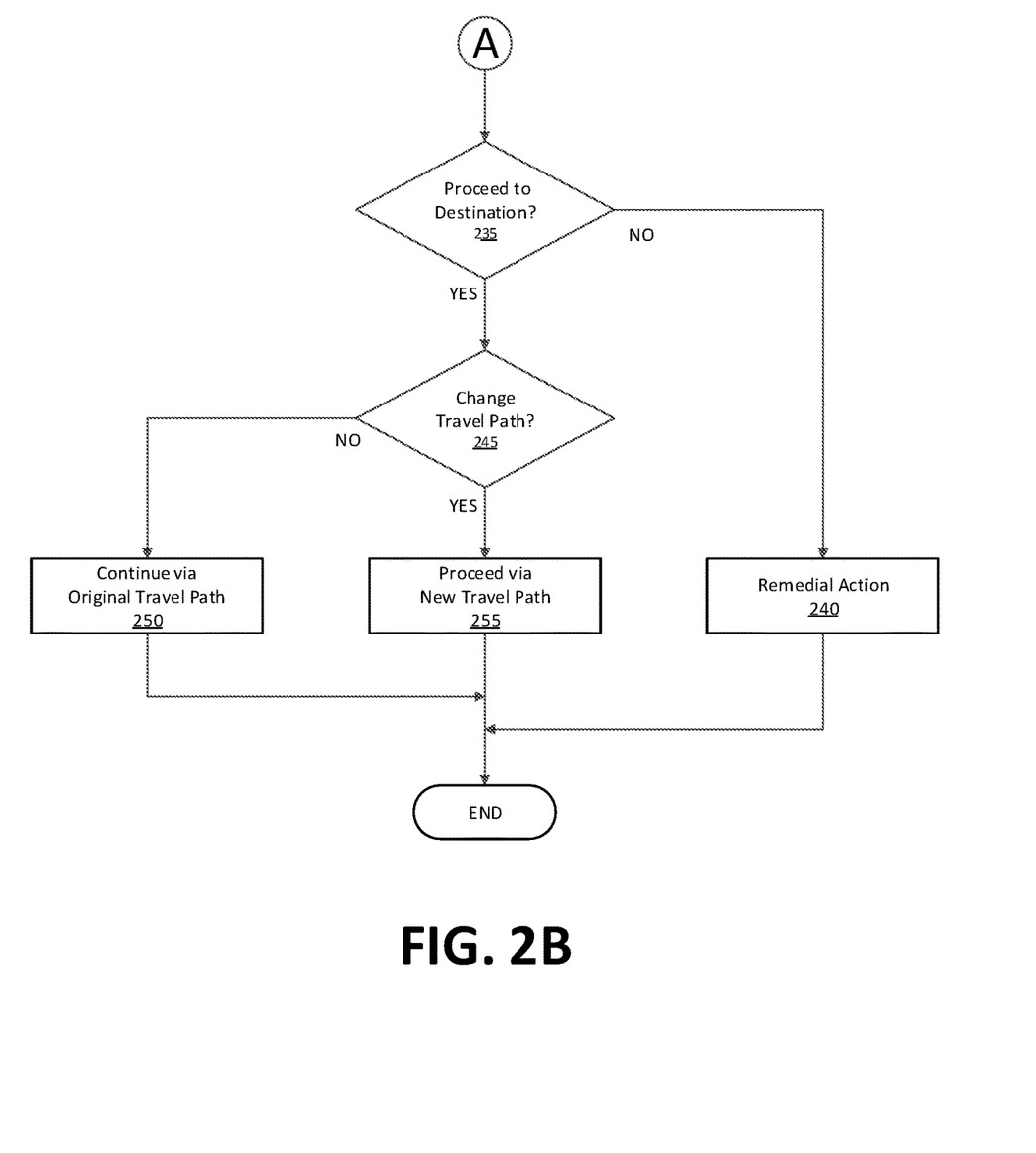

FIGS. 2A and 2B are diagrams respectively of a first portion and a second portion of an exemplary process 200 for managing autonomous vehicle failure modes. The process 200 starts in a block 205.

In the block 205 the vehicle 12 computer 20 initiates a trip. The trip may be initiated based on input from a user or another computing device. As an example, the input may be from a user providing destination data and requesting that the vehicle 12 travel to the destination. As another example, the input may be from a computing device such as the server 14, providing destination data and requesting that the vehicle 12 travel to the destination.

In some cases, the vehicle 12 computer 20 may initiate a trip with user input, for example to proceed to a fueling station for refueling. In this case, the computer 20 may determine destination data from, e.g., a data base of available fueling stations.

Based on the destination data, the computer 20 determines a route, and begin to operate along the route. The vehicle 12 computer 20 may operate the vehicle 12 using autonomous vehicle control techniques such as are known. Upon beginning to travel along the route, the process 200 continues in a block 207.

In the block 207, the vehicle 12 computer 20 receives data reporting operating conditions of the vehicle 12. The computer 20 may receive the data from vehicle 12 sensors 22 and additionally from controllers 24. The data may indicate operating conditions such as speed, heading, acceleration, etc. of the vehicle 12. The data may further indicate environmental conditions such as the temperature, humidity, road grade, road condition, wind speed, amount of light, etc. along the route. The data may still further indicate operating conditions of vehicle 12 internal systems such as engine temperature, coolant temperature, brake pressure, tire pressure, battery charge, etc.

The computer 20 may collect some of the data as part of the execution of the autonomous vehicle control techniques. Additionally or alternatively, the computer 20 may execute, during operation of the vehicle 12, diagnostic tests, to collect additional data.

Upon receiving the data, the process 200 continues in a block 210.

In the block 210, the computer 20 determines whether a failure mode is present.

The computer 20 may analyze the data and determine whether a failure mode is present. In the case that no failure mode is determined, the process continues in the block 207. In the case that one or more failures modes are determined, the process 200 continues in a block 215.

In the block 215, the vehicle 12 computer 20 wirelessly transmits data to the server 14. The data includes the failure mode, and may include a diagnostic trouble code. As described above, the diagnostic trouble code may provide specific information as to which sub-system in the vehicle 12 exhibited the failure mode, and under what conditions.

Additionally, the data transmitted by the vehicle 12 computer 20 to the server 14 may include data indicating vehicle 12 operating conditions, as described above.

The vehicle 12 computer 20 may request authorization from the server 14 to continue to the destination.

In some cases, the vehicle 12 computer 20 may, prior to sending the data, determine a risk associated with the failure mode.

Failure modes may be assigned a numeric risk level, e.g. on a scale from 0 to 1. The risk level is a numeric indication of the risk of a failure mode resulting in a collision or vehicle breakdown. The vehicle 12 computer 20 may include a first table of failure modes which identifies each type of failure mode, and assigns a numeric risk level to the failure mode. For example, a malfunctioning sensor that incorrectly activates the "check engine" warning may be assigned a risk level of 0.01. A brake line that has insufficient pressure may be assigned a risk level of 0.95.

Risk levels, as stored in the risk level table, may be normalized to a trip level of 100 miles. The risk level, based on the table, may be weighted according to a length of a planned trip. For example, for a planned trip of 250 miles, a weighting for the trip length may be 2.5.

The vehicle 12 computer 20 may include one or more additional tables. The additional tables may provide weighting factors to determine a weighted risk level of a failure mode based on environmental conditions. For example, a tire with low pressure may have a risk level of 0.2. For a trip that is occurring in the rain, however, the risk level may be weighted with a factor of 1.5, resulting in a weighted risk level associated with the low tire pressure for the trip in the rain to 0.3.

In a case that the risk level associated with a failure mode is determined to be equal to or above a threshold, the vehicle 12 computer 20 may autonomously take a remedial action such as operating the vehicle to a safe location and halting the vehicle 12, halting the vehicle 12 in place, etc. In the case, as described above, that risk levels are assigned to failure modes, and weighted based on environmental factors, the threshold may be, for example, a fixed value such as 0.7. Failure modes with a risk level of 0.7 or greater may cause the vehicle to take immediate remedial action.

The vehicle 12 computer 20 may transmit the data including failure mode and the determined risk level of the failure mode to the server 14, indicating that the vehicle 12 has halted operation.

Upon transmitting the data to the server 14, the process 200 continues in a block 220.

In the block 220, the server 14 requests and/or retrieves additional information.

For example, the server 14 may retrieve data from a memory communicatively coupled with the server 14. As another example, the server 14 may retrieve data from one or more data sources 16.

The collected/retrieved data may include, for example, data related to the failure mode identified by the vehicle 12. For example, the vehicle 12 may have a back-up system that can replace some of the functionality of an identified failed component. The data may indicate a likelihood of the back-up system failing. The data may indicate a frequency of failure, such as 1 failure in every 300,000 miles of operation, and determine, based on the frequency of failure, the likelihood of a failure during the planned trip. The data may be dependent on the age of the back-up system. For example, the likelihood of a 15 year old back-up system failing during the trip may be higher than the likelihood of a 5 year old back-up system failing during the trip.

The collected/retrieved data may further include data such as current and expected weather along a route, current and expected weather along one or more alternative routes, current and expected traffic along a route, current and expected traffic along one or more alternative routes, etc.

The collected data may further include data related to the cargo and/or passengers of the vehicle 12. For example, the data may include the information that a passenger in the vehicle 12 is urgently in need of medical attention.

Upon collecting the additional data, the process 200 continues in a block 225.

In the block 225, the server 14 analyzes the data received from the vehicle 12 computer 20 and additional collected data to determine an action based on the failure mode.

The server 14 may be programmed to perform a variety of analyses on the data. A non-limiting list of examples includes (1) identifying possible vehicle 12 back-up sub-systems for a failing component or sub-system, (2) identifying a reliability of the back-up sub-systems for the failing component or sub-system, (3) identifying environmental circumstances such as weather or road conditions that increase or decrease the risk presented by the failure mode or by the use of the back-up subsystem, (4) analyzing a potential impact to the cargo and/or passengers of the vehicle 12 (e.g., when there is a passenger on-board travelling to a hospital for urgent medical treatment, a likelihood of negative consequences to the passenger may be increased by halting the vehicle), (5) data from other vehicles 12 of a same or similar type that experienced this failure mode (for example, that typically it was a failure of a non-critical sensor and typically did not present a risk of a collision or vehicle breakdown during the trip), assessing the likelihood of negative consequences of halting the vehicle 12 in a location (is the location known to be dangerous, are weather conditions becoming progressively worse), etc.

As an example analysis, the server 14 may receive data from the vehicle 12 computer 20 that a wheel-speed sensor failed. The server 14 may determine that the data from the failed sensor may be replaced with data from other sensors, for example, wheel-speed sensors on other wheels. An individual wheel-speed sensor failure may be assigned a risk level, before considering weighting factors, of 0.4. This value may be stored, for example, in a table of failure modes, with each failure mode being assigned a risk level.

As described above, the risk level may be normalized to a trip length of 100 miles. The server 14 may adjust the risk level by a trip length factor based on the planned length of the trip. For example, the planned length for this trip may be 90 miles, resulting in a trip length factor of 90/100=0.9.

Additionally, for each failure mode, the server 14 may include a plurality of weighting tables, each weighting table including weighting factors which can be applied in determining a weighted risk level for the failure mode. For example, for the wheel-speed sensor, the server 14 may include one weighting table for rain conditions, one for traffic conditions, and one for vehicle age for the particular type of vehicle 12. Portions of the tables may appear as follows:

TABLE 1

Weighting Table for Rain Conditions
for a Wheel-speed Sensor Failure Mode

| Condition | Weighting Factor |
|---|---|
| Continuous Rain | 2 |
| Intermittent Rain | 1.2 |
| Dry | 1 |

TABLE 2

Weighting Table for Traffic Conditions
for a Wheel-speed Sensor Failure Mode

| Condition | Weighting Factor |
|---|---|
| Heavy traffic | 1.1 |
| Moderate traffic | 1 |
| Low traffic | 1 |

TABLE 3

Weighting Table for Vehicle Age for a Wheel-speed Sensor
Failure Mode (for a particular type of vehicle)

| Condition | Weighting Factor |
|---|---|
| 0-8 years | 1 |
| 8-12 years | 1.1 |
| >12 years | 1.25 |

As a first example, the server 14 may further receive data indicating that the weather along the planned route is expected to be clear and sunny. Based on table 1 above, the weighting factor of the fault condition for rain would be 1.

Data received may further indicate that the traffic conditions along the planned route are moderate. Based on table 2 above, the weighting factor for traffic is also 1.

Further, the server 14 may receive data indicating the age of the vehicle 12 to be 14 years old. Based on table 3 above, the weighting factor for the vehicle 12 age is 1.25.

After determining each of the weighting factors, a weighted risk level of the wheel-speed sensor failure mode may be determined according to the following equation.

$$\text{weighted risk} = \text{risk level} * \text{trip length factor} * \text{rain factor} * \text{traffic factor} * \text{age factor} \quad \text{(Eq. 1)}$$

For the example above, the weighted risk level would be 0.4*0.9*1*1*1.25=0.45.

The weighted risk level may be compared, for example, to a risk level threshold to permit continued operation. The risk level threshold may be, for example, a fixed value of 0.7. In this case, the weighted risk level 0.5 is below the threshold of 0.7. The server 14 determines that the vehicle 12 can continue to the destination.

Alternatively, following the same example, the server 14 may determine that the weather along an originally planned route is expected to be rainy. Rainy weather would render the wheel speed data from the other wheels unreliable, due to possible slippage of the wheels. As before, data may indicate that traffic conditions along the planned route are moderate and the age of the vehicle is 14 years. In this case, the server 14 can determine that the weighted risk level=0.4*0.9*2*1*1.25=0.9.

However, additional data available to the server 14 may indicate that the weather along an alternate route is dry, and the traffic volume is low. The alternate route may also be 90 miles long. For the alternate route, the weighted risk level can be determined to be 0.4*0.9*1*1*1=0.36.

The weighted risk level for the alternate route (0.36) is less than the weighted risk level along the originally planned route (0.9). Further, the weighted severity along the alternate route (0.0.36) is less than the risk level threshold (0.7). Based on these determinations, the server 14 determines that the vehicle 12 can continue to the destination along the alternate route.

Upon completing the analysis of the block 225, the process 200 continues in a block 230.

In the block 230, the server 14 sends one or more instructions to the vehicle 12 computer 20, based on the analysis performed in the block 225. As non-limiting examples, the server 14 may instruct the computer 20 to operate the vehicle 12 along the original route, operate the vehicle 12 along an alternate route, or instruct the vehicle 12 to engage in one or more other remedial actions. Additionally, the server 14 may send instructions to service providers such as repair service providers, vehicle providers, transportation providers, etc.

As described above, in some cases, the server 14 may be programmed, prior to transmitting an instruction to the vehicle 12 or taking another action, to request authorization from a user. Upon receiving authorization from the user, the server 14 then proceeds to transmit the instruction to the vehicle 12 or take the other action.

Further, in some cases, the server 14 may fail to send a response to the vehicle 12 computer 20 within a time period for a response. The time period for a response may be, e.g., a fixed time period such as 30 seconds.

Upon sending instructions to the vehicle 12 computer 20 and other service providers, or, expiration of the time period for the response prior to the server 14 sending a response, the process 200 continues in a block 235.

In the block 235, the vehicle 12 computer 20 determines, based on instruction received from the server 14, whether the vehicle 12 should continue to the destination, or abort the trip and undertake remedial actions. In the case that the vehicle 12 computer 20 is instructed to abort the trip and take remedial actions, or, in a case that a response from the server 14 is not received, the process 200 continues in a block 240. In the case that the vehicle 12 computer 20 is instructed to continue to the destination, the process 200 continues in a block 245.

In the block 240, in the case that the vehicle 12 computer 20 receives a response from the server 14, the vehicle 12 computer 20 undertakes remedial action based on instructions from the server 14. Non-limiting examples of remedial actions which may be undertaken by the vehicle 12 computer 20 include (1) halting the vehicle 12 in place and waiting for a service provider such as a repair service, a towing service, a transport service, etc. to come to the location, (2) operating the vehicle 12 to a safe location such as a parking area, and waiting for a service provider, (3) operating the vehicle 12 to a repair station, etc. In the case that the vehicle 12 computer 20 did not receive a response from the server 14 within the time period for a response, the vehicle 12 computer 20 halts the vehicle. Upon undertaking the remedial action and/or halting the vehicle, the process 200 ends.

In the block 245, which follows the block 235, the vehicle 12 computer 20 determines, based on the received instructions, whether the vehicle 12 continues along the original route or along a new route. In the case that the computer 20 is instructed to continue along the original route, the process 200 continues in a block 250. In the case that the computer 20 is instructed to proceed via a new route, the process 200 continues in a block 255.

In the block 250, the computer 20 operates the vehicle 12 along the original route to the destination. The process 200 ends.

In the block 255, the computer 20 operates the vehicle 12 along a new route determined by the server 14 to the destination. The process 200 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a vehicle computer and a remote server,
wherein the vehicle computer is programmed to:
determine a first risk level for operating a vehicle based on (1) a trouble code indicating a failure of a specified vehicle electronic control unit or sensor and (2) stored data specifying the first risk level for the failure of the specified vehicle electronic control unit or sensor;
transmit the first risk level to a remote server;
then, after transmitting the first risk level, receive, from the remote server, an instruction to take an action; and
operate the vehicle to take the action; and
wherein the remote server is programmed to:
receive the first risk level from the vehicle computer;
based on the first risk level and additional data that includes a stored weight that is applied to the additional data, determine a second risk level for the failure of the specified vehicle electronic control unit or sensor;
based on the second risk level, determine an action for the vehicle; and
transmit the action to the vehicle computer.

2. The system of claim 1, wherein the vehicle computer is further programmed to:
halt the vehicle based on determining that the initial risk level of the failure is greater than a threshold; and
begin to move the vehicle again based on the action in the instruction from the remote server.

3. The system of claim 1, wherein the action includes operating by revising a route to a destination based on determining that revising the route reduces the second risk level with respect to the first risk level.

4. The system of claim 1, wherein the second risk level is based on first weather data along an original route and second weather data along a revised route.

5. The system of claim 1, wherein the additional data is received from a source different than the vehicle computer or the remote server.

6. The system of claim 1, wherein the vehicle computer is further programmed to:
determine, that within a time period specified for transmitting the initial data to the remote server, that the vehicle computer did not receive a response from the remote server; and
halt the vehicle based on determining that the vehicle computer did not receive the response.

7. The system of claim 1, wherein the additional data includes data indicating a back-up system on the vehicle that can replace some of the functionality of the failure; and the revised risk level is based in part on the data indicating the back-up system.

8. The system of claim 7, wherein the additional data includes a reliability of the back-up system.

9. The system of claim 1, wherein the additional data includes data from other vehicles of a same type, and the revised risk level is based in part on the data from the other vehicles of the same type.

10. A method comprising:
determining a first risk level for operating a vehicle based on (1) a trouble code indicating a failure of a specified vehicle electronic control unit or sensor and (2) stored data specifying the first risk level for the failure of the specified vehicle electronic control unit or sensor;
transmitting the first risk level from a vehicle computer to a remote server;
receiving the first risk level in the remote server;
based on the first risk level and additional data that includes a stored weight that is applied to the additional data, determining, in the remote server, a second risk level for the failure of the specified vehicle electronic control unit or sensor and, based on the second risk level, an action for the vehicle;
then transmitting an instruction including the action from the remote server to the vehicle computer
receiving, from the remote server, the instruction to take the action; and
operating the vehicle to take the action.

11. The method of claim 10, further comprising:
halting the vehicle based on determining that the initial risk level of the failure is greater than a threshold; and
beginning to move the vehicle again based on the action in the instruction from the remote server.

12. The method of claim 10, wherein the action includes operating by revising a route to a destination based on determining that revising the route reduces the second risk level with respect to the first risk level.

13. The method of claim 12, wherein the second risk level is based on first weather data along an original route and second weather data along a revised route.

14. The method of claim 10, further comprising:
determining, that within a time period specified for transmitting the initial data to the remote server, that the vehicle computer did not receive a response from the remote server; and
halting the vehicle based on determining that the vehicle computer did not receive the response.

* * * * *